(12) United States Patent
Caspi et al.

(10) Patent No.: US 8,060,782 B2
(45) Date of Patent: Nov. 15, 2011

(54) ROOT CAUSE PROBLEM IDENTIFICATION THROUGH EVENT CORRELATION

(75) Inventors: Ziv Caspi, Ramat Gan (IL); Ron E. Dar Ziv, Tel Aviv (IL); Yifat Orlin, Tel Aviv (IL); Alexander Sloutsky, Raanana (IL); Itai Frenkel, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 25 days.

(21) Appl. No.: 12/714,842

(22) Filed: Mar. 1, 2010

(65) Prior Publication Data

US 2011/0214020 A1 Sep. 1, 2011

(51) Int. Cl.
*G06F 11/00* (2006.01)
(52) U.S. Cl. .............................. 714/26; 714/47.1; 714/48
(58) Field of Classification Search ........................ None
See application file for complete search history.

(56) References Cited

U.S. PATENT DOCUMENTS

| | | | |
|---|---|---|---|
| 6,072,777 A | 6/2000 | Bencheck et al. | |
| 6,694,364 B1 * | 2/2004 | Du et al. ........................ | 709/224 |
| 7,047,291 B2 | 5/2006 | Breese et al. | |
| 7,529,974 B2 | 5/2009 | Thibaux et al. | |
| 2003/0195959 A1 * | 10/2003 | Labadie et al. ............... | 709/224 |
| 2004/0049565 A1 | 3/2004 | Keller et al. | |
| 2008/0059839 A1 * | 3/2008 | Hamilton et al. ............... | 714/26 |
| 2009/0313508 A1 * | 12/2009 | Yan et al. ........................ | 714/47 |

OTHER PUBLICATIONS

Fu, et al., "Quantifying Temporal and Spatial Correlation of Failure Events for Proactive Management", Retrieved at <<http://www.cs.nmt.edu/~song/Publications/FC-srds07.pdf>>, 26th IEEE International Symposium on Reliable Distributed Systems, 2007, pp. 175-184.
Glerum, et al., "Debugging in the (Very) Large: Ten Years of Implementation and Experience", Retrieved at <<http://www.sigops.org/sosp/sosp09/papers/glerum-sosp09.pdf>>, SOSP, Oct. 11-14, 2009, Big Sky, Montana, USA, pp. 1-17.
Kiciman, Emre, "Using Statistical Monitoring to Detect Failures in Internet Services", Retrieved at <<http://research.microsoft.com/pubs/75094/kiciman-thesis.pdf>>, Sep. 2005, pp. 183.
Crowell, Christopher, "Event Correlation and Root Cause Analysis", Retrieved at <<http://ca.com/files/WhitePapers/event_correlation_and_root_cause_analysis.pdf>>, Mar. 2004, pp. 15.
Maruyama, et al., "Model-Based Fault Localization in Large-Scale Computing Systems", Retrieved at <<http://matsu-www.is.titech.ac.jp/~naoya/publications/ipdps08.pdf, Apr. 2008, pp. 12.

* cited by examiner

*Primary Examiner* — Michael Maskulinski

(57) ABSTRACT

Correlating activity events to identify a root cause of a process failure. Activity event data is received from a process executing on a computing device. The activity event data corresponds to a plurality of activity events. Each of the activity events has a correlation identifier, a resolution status, and an occurrence time value associated therewith. Each of the activity events are assigned to one of a plurality of event groups based on the correlation identifier of the activity event. Thereafter, at least one of the event groups is determined to have an activity event with a resolution status indicating failure of the process. One of the activity events within the determined event group is selected as a root cause activity event based on the occurrence time values. In some embodiments, the root cause activity event is identified to a user of the computing device.

20 Claims, 4 Drawing Sheets

ROOT CAUSE PROBLEM IDENTIFICATION THROUGH EVENT CORRELATION

BACKGROUND

Root cause identification is a class of methods in the problem-solving field that identify root causes of problems or events. Generally, problems can be solved by addressing the root causes of the problems, instead of addressing symptoms that are being continuously derived from the problem. Ideally, when the root cause has been addressed, the symptoms following the root cause will disappear. Traditional root cause analysis is performed in a systematic manner with conclusions and root causes supported by evidence and established causal relationships between the root cause(s) and problem(s). During root cause identification, however, it is difficult to differentiate between events that demand manual intervention of an operations team of a service/product from events that do not demand manual intervention. Such differentiation is important, for example, in software services and enterprise IT departments because an ongoing operation cost of a service is proportional with the number of support tickets that a system issues.

Some existing systems detect errors in a process by assuming that a first or last error event that occurs during analysis window execution of the process is the root cause. However, this approach lacks precision and may produce false alarms (e.g., if the error event is not severe, is only temporary, or if the event self-resolves). Further, it is difficult and time-consuming to trace code paths to understand the reason for each failure.

SUMMARY

Embodiments of the disclosure provide automated root cause identification. Some embodiments receive activity event data from a process executing on a computing device with each of the activity events having a correlation identifier, a resolution status, and an occurrence time value associated therewith. Each of the plurality of activity events are assigned to one of a plurality of event groups based on the correlation identifier and type of the activity. An event group is identified indicating failure of the process, and one of the activity events from the identified event group is selected and identified to a user as a root cause activity event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the present disclosure provide a system 100 for monitoring a plurality of processes (e.g., process #1 through process "N") on a plurality of monitored computing devices (e.g., monitored computing device #1 through monitored computing device #N,). Embodiments of the disclosure provide an ability to automatically determine root cause identification by correlating activity events, for example, low-level cause events, such as "failed to connect to a database", and system-level failure events (e.g., an enrollment activity failing in 95% of attempts over a predefined time period). With an ability to correlate low-level cause events from system level failure events, support tickets and troubleshooting can be provided more effectively to minimize the number of support tickets issued and time spent troubleshooting thus reducing cost.

A process is separated into activity events (e.g., activity/process start, activity/process finish (failure), activity/process finish (success), and error events). An activity event that is either an error event or an activity/process finish (failure) is marked with a correlation identifier unique among other activity event identifiers. The correlation identifier is used to track and correlate each of the activity events. A correlation identifier is created the first time an error occurs and is attached to the error. For example, a correlation identifier is "tagged" to the first activity event that produces an error event. Thereafter, each activity event that produces an error as a result of the first activity event that produces an error event are tagged with the same correlation identifier as the first activity event that produced an error event. Activity events that have the same correlation identifier are all considered to be within the same event group. Each event group is identified with a resolution status, for example, "failed", "succeeded" or "successfully recovered from error" (e.g., the system 100 automatically resolved the issue resulting in the error). Using this technique, the system 100 can "ignore" activity events from which the system 100 successfully recovered (e.g., an event group with a resolution status of "successfully recovered") and focus on the event groups from which the system 100 did not successfully recover resulting in failure.

Embodiments of the disclosure also provide an ability to differentiate between errors in the system 100 that indicate a problem with a local or internal component versus a problem with a remote or external component (e.g., when a system is not functioning due to a failure in external components). The differentiation occurs by determining a location/scope of the failure. For example, aspects of the disclosure may determine a back-end as the failure locality despite failures occurring from front-end flows.

Figure 1:
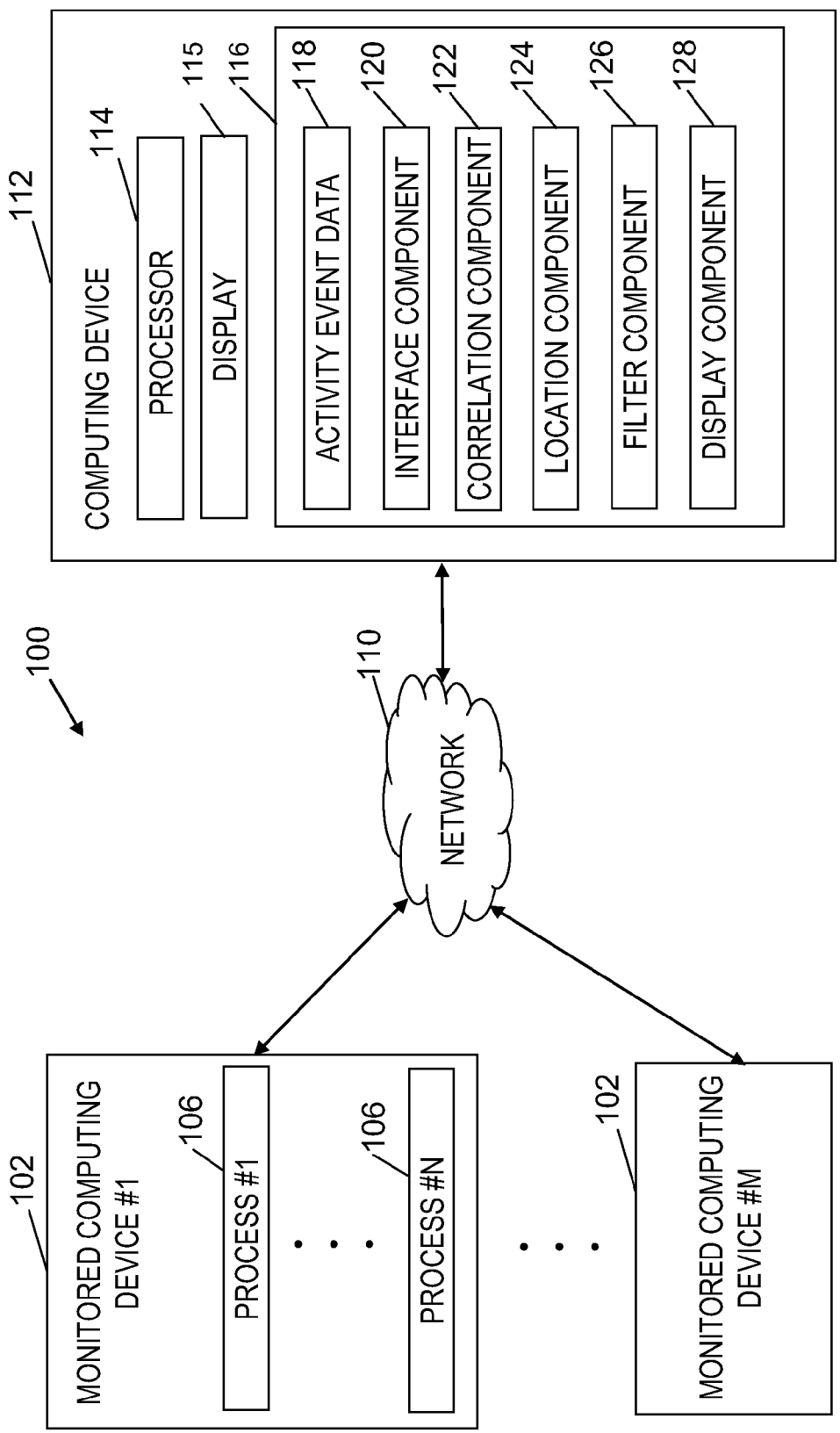
FIG. 1 is an exemplary block diagram of a system monitoring a plurality of processes on a plurality of devices.

Referring again to FIG. 1, an exemplary block diagram of the system 100 is provided. The system includes a computing device 112, one or more networks 110, and monitored computing devices 102 (e.g., monitored computing device #1 through monitored computing device #N). The computing device 112 is configured to communicate with the monitoring computing devices 102 via the one or more networks 110.

While some embodiments of the disclosure are illustrated and described herein with reference to the computing device 112 being a server computing device, aspects of the disclosure are operable with any device that performs the functionality illustrated and described herein, or its equivalent. For example, embodiments of the disclosure are operable with netbooks, desktop computing devices, laptop computers, and other computing devices. In such embodiments, data may be stored by a cloud service and accessible by any computing device implementing functionality of the disclosure. Further, in some embodiments, monitored computing device 102, network 110 and computing device 112 may be located on the same physical machine. In such a topology, there may be a plurality of systems each responsible for reporting failures of each system separately. Because of the localization/scope discussed above, tautological reporting about the failures from several systems is eliminated in these embodiments. As such, the system on which the failure was first encountered reports the failure.

Referring again to FIG. 1, an exemplary block diagram illustrates the computing device 112 having a memory area 116 for storing components for automatically identifying a root cause activity event. The computing device 112 further includes a display 115 and at least one processor 114. The display 115 may be, for example, a capacitive touch screen display that is integrated into the computing device 112, external to the computing device 112 or any kind of log that keeps a history of failures on device 112 for further processing. User input functionality is provided in the display 115 which acts as a user input selection device as well as a means to provide a user with an identity of a root cause activity event. In embodiments, the display 115 is configured to be responsive to a user pressing contact on the display 115 to selectively perform functionality. Thus, a user can operate the desired troubleshooting functions available with the computing device 112 by contacting a surface of the display 115 as well as other functions provided herein.

Memory area 116 stores activity event data 118 and one or more computer-executable components. Exemplary components include, but are not limited to, an interface component 120, a correlation component 122, a location component 124, a filter component 126, and a display component 128. While the activity event data 118 and components 120-128 are shown to be stored in memory area 116, the activity event data 118 and components 120-128 may be stored and executed from a memory area remote from computing device 112. For example, the activity event data 118 may be stored in a cloud service, a database, or other memory area accessible by computing device 112. Such embodiments reduce the computational and storage burden on computing device 112.

Processor 114 executes computer-executable instructions for implementing aspects of the disclosure. In some embodiments, the processor 114 is transformed into a special purpose microprocessor by executing computer-executable instructions or by otherwise being programmed. For example, the interface component 120, when executed by the processor 114, causes the processor 114 to receive activity event data 118. The activity event data 118 corresponds to a plurality of activity events (e.g., activity/process start, activity/process finish (failure), activity/process finish (success), and error events).

Figure 2:
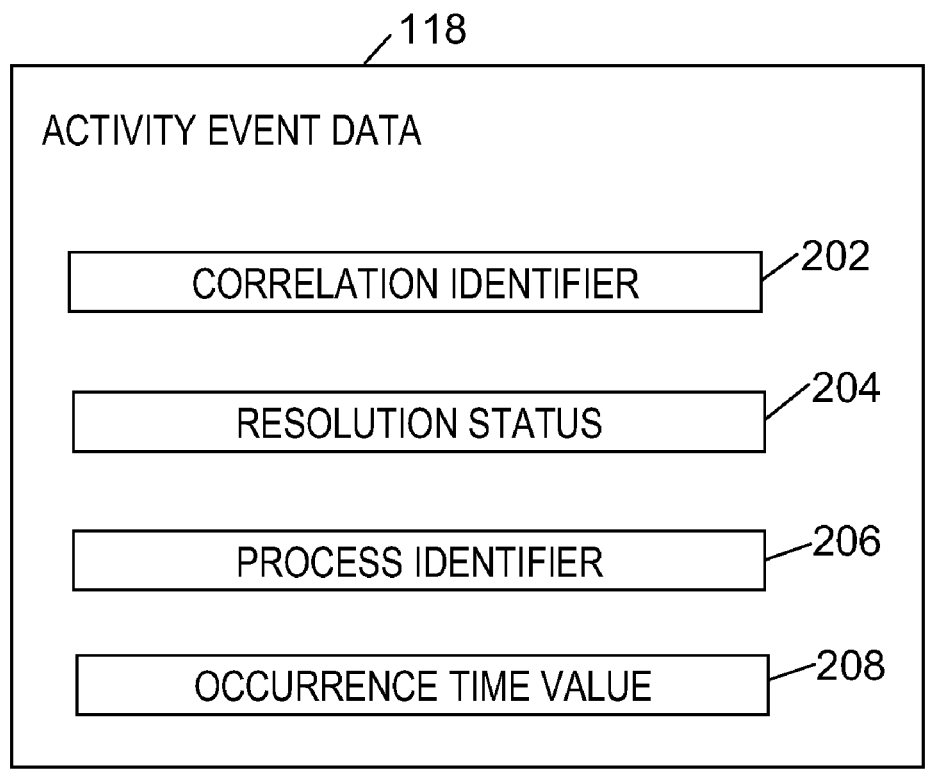
FIG. 2 is an exemplary block diagram illustrating data associated with an activity event.

With reference to FIG. 2, an exemplary block diagram illustrating data associated with activity event data 118 is shown. Exemplary data includes a correlation identifier 202 for tracking and correlating activity events, a resolution status 204 for identifying an activity event as "failed", "succeeded" or "successfully recovered from error", a process identifier 206 for associating an activity event with a particular process, and an occurrence time value 208 for determining a chronological order of activity events, which is then used to identify the root cause activity event. For example, the occurrence time value is a timestamp or a value derived therefrom.

In some embodiments, the monitored computing devices 102 provide the activity event data 118. In other embodiments, other devices or application programs provide, calculate, or assign one or more elements of the activity event 118.

With reference back to FIG. 1, the correlation component 122, when executed by the processor 114 causes the processor 114 to assign each of the plurality of activity events to one of a plurality of event groups based on the correlation identifier 202 of the activity event. In one embodiment, the correlation component 122 tags a correlation identifier to a first activity event identified as an error event and tags the same correlation identifier to any activity event identified as an error event as a result of the first activity event being identified as an error event. In embodiments, the correlation identifier 202 assigns each of the activity events with a same correlation identifier to an event group. A process may have one more event groups that make up the process, with each event group being representative of one more activity events with the same correlation identifier.

The location component 124, when executed the processor 114, causes the processor 114 to identify at least one of the plurality of event groups having at least one of the activity events assigned thereto with a resolution status indicating failure of a process identified by the process identifier of the at least one of the activity events. Thus, an event group with a resolution status indicating a failure is reviewed, while an event group with a resolution status indicated a successful resolution is ignored. In embodiments, event groups with a "successful" resolution status are reviewed between a predefined period of time to determine a number of times each of the event groups have had an error event during the predefined time period, but were successfully recovered. This number is compared to a threshold number or a threshold percentage to determine if the error event/successful resolution is occurring on a frequent enough basis (e.g., an enrollment activity failing in 95% of attempts over a predefined time of three periods of five minutes each) to provoke a support ticket, troubleshooting, or further review by a user.

The filter component 126, when executed by the processor 114, causes the processor 114 to select one of the at least one of the activity events from the identified event group as a root cause activity event based on the occurrence time values of each activity event. For example, a first activity event in a process to be identified as an error event is assigned an occurrence time value of "1". Thereafter, the next activity event identified as an error event is assigned an occurrence time value of "2" and so on. Therefore, an assumption can be made that the lowest occurrence time value in each event group is the root cause activity event. In embodiments, the filter component 126 also determines a level of importance of the plurality of activity events and issues a service ticket based on the determined level of importance of the plurality of activity events. The level of importance of the plurality of activity events is based on an event group type or both an event group type and a root cause activity event. The display component 128, when executed by the processor 114, causes the processor 114 to present to a user the activity event data 118 associated with the root cause activity event. In addition, the processor 114 may also be programmed with instructions such as described herein with reference to FIG. 3 and FIG. 4.

Figure 3:
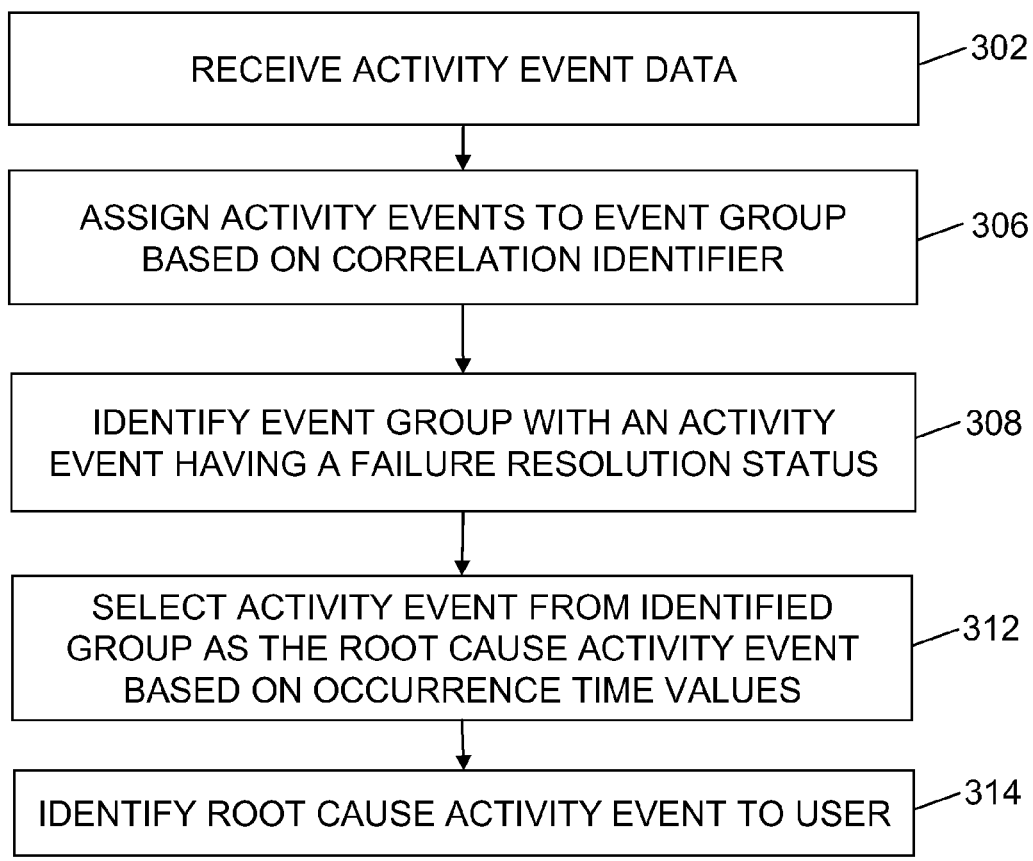
FIG. 3 is an exemplary flow chart illustrating a process for identifying a root cause of a problem.

Referring next to FIG. 3, an exemplary flow chart illustrates a process for root cause activity event identification. At 302, activity event data is received (e.g., the activity event data 118) from a process executing on a monitored computing device (e.g., one of monitored computing devices 102). The activity event data corresponds to a plurality of activity events (e.g., activity/process start, activity/process finish (failure), activity/process finish (success), and error events). Each of the activity events includes one or more of the following: an activity type (e.g., memory access, data operation, data communication, and the like), an activity instance identifier, a correlation identifier, a resolution status, and an occurrence time value. In embodiments, a level of importance of the plurality of activity events is determined based on an event group type or both an event group type and a root cause activity event or both an event group type and an activity type.

Therefore, activity events that are considered more important and/or more urgent than the others can be addressed before other activity events that are considered to be not as important and/or not as urgent.

At 306, each of the plurality of activity events is assigned to one of a plurality of event groups based on the correlation identifier of the activity event. In one embodiment, a correlation identifier is tagged/assigned to a first activity event identified as an error event with the same correlation identifier being tagged/assigned to any activity event identified as an error event generated therefrom, and each of the activity events with the same correlation identifier are assigned to the same event group. A process may have one more event groups that make up the process, with each event group being representative of one more activity events with the same correlation identifier.

At 308, at least one of the plurality of event groups having at least one of the activity events assigned thereto is identified with a resolution status indicating failure of the process. In embodiments, a number of times a process has failed in a predefined time period and an amount of time periods during which the process has failed are determined and a service ticket is provided. However, this review process is not limited to processes that have failed and are not resolved, processes or event groups with a "successful" resolution status may be reviewed between predefined time periods to determine a number of times each of the event groups have had an error event between the predefined time periods, but were successfully recovered. As mentioned above, this number is compared to a threshold number or a threshold percentage to determine if the error event/successful resolution is occurring on a frequent enough basis (e.g., for example, an enrollment activity failing in 95% of attempts over a predefined time period of one week) to provoke a support ticket, troubleshooting, or further review by a user.

At 312, one of the at least one of the activity events is selected from the identified event group as a root cause activity event based on the occurrence time values. In embodiments in which a first error event in the identified event group is assigned an occurrence time value of "1," and thereafter, the next error event in the same event group is assigned an occurrence time value of "2," and so on, the error event with the lowest occurrence time value is identified as the root cause activity event. In embodiments in which the occurrence time value is a timestamp, the error event in the identified event group with the earliest timestamp value is identified as the root cause activity event.

At 314, the root cause activity event is identified to a user of the computing device. In embodiments, each of the error events are presented to the user in order of importance, and each event group is presented with a resolution status. In other embodiments, the root cause activity event is stored in a log for subsequent access.

Figure 4:
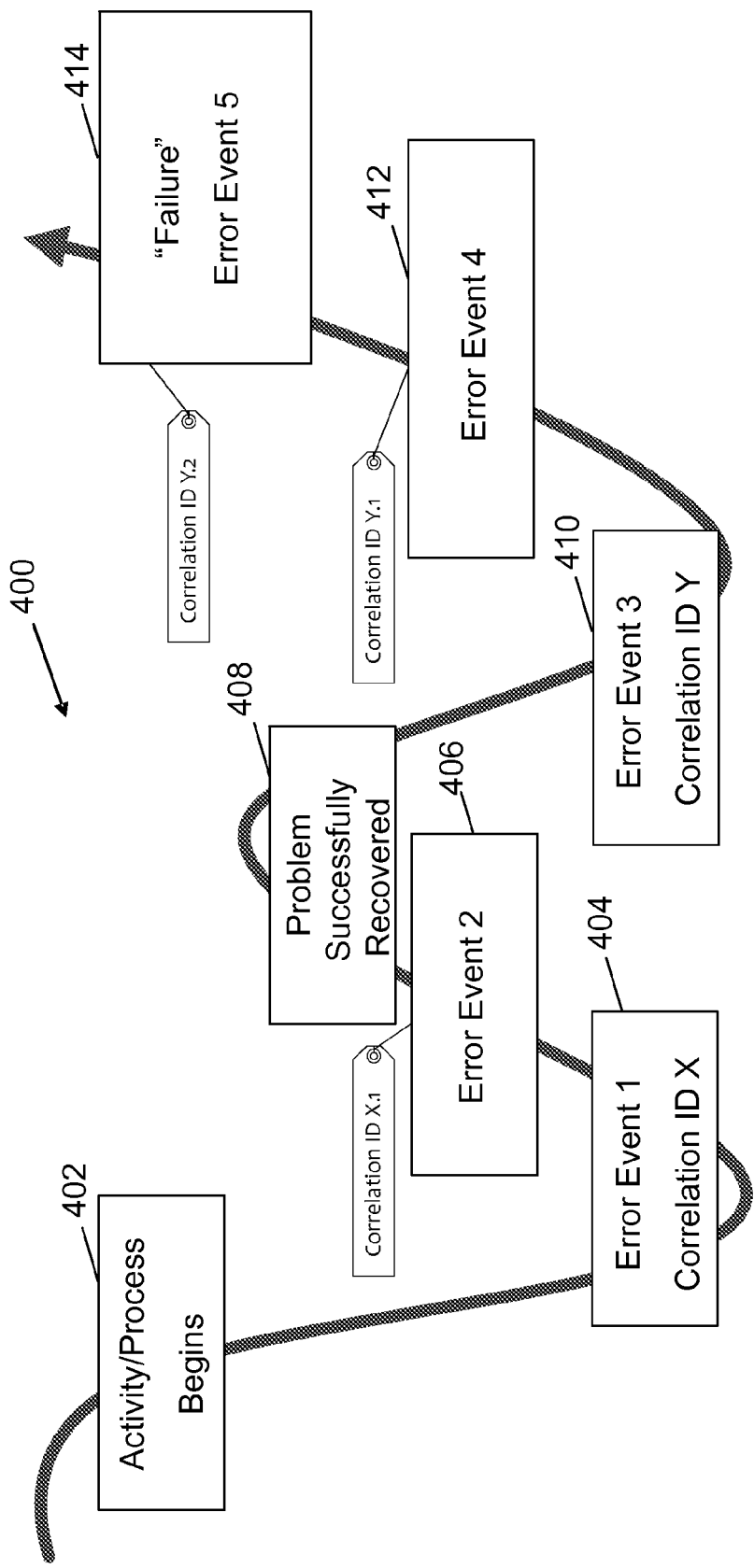
FIG. 4 is an exemplary flow diagram illustrating selection of an activity event as a root cause of a problem.

Referring next to FIG. 4, an exemplary flow diagram illustrating a process 400 for root cause activity event identification is shown. The process 400 begins at activity event 402 identified as "activity/process start". The process 400 continues to activity event 404 where an error event is identified. Thus, activity event 404 is labeled an "error event". Because activity event 404 is the first error event in the process 400, a correlation identifier "X" is assigned to the activity event 404. Further, the activity event 404 is assigned an occurrence time value of "1" because the activity event 404 is the first error event in the process 400. The process 400 continues and an additional error event is indicated at activity event 406 and activity event 406 is labeled an "error event". However, because the indicated error event of activity event 406 is generated from the indicated error event of activity event 404, the activity event at 406 is assigned a correlation identifier (e.g., correlation identifier "X") that is the same as the correlation identifier assigned to the activity event 404. The activity event 406 is also assigned an occurrence identifier value of "2" because the activity event 406 is the second error event in the process 400.

The process 400 continues to activity event 408. Activity event 408 is identified as an "error resolved" activity event. Therefore, because the error that began with activity event 404 is resolved, the activity event 408 is not assigned a correlation identifier or an occurrence identifier value (in some embodiments). However, the next activity event that is identified as being an error event is assigned a correlation identifier that is different from any other correlation identifier previously provided by the current process. For example, as the process 400 continues, activity event 410 is identified as an error event. Thus, because activity event 410 is the first error event after resolution of the previous error event, a different correlation identifier "Y" is assigned. The correlation identifier "Y" is also different from any other correlation identifier assigned to the process (or group of processes being monitored). The activity event 410 is also assigned an occurrence identifier value of "3" because activity event 410 is the third error event in the process 400.

The process 400 continues to activity event 412, which is identified as an error event. However, because the indicated error event of the activity event 412 is generated from the indicated error event of activity event 410, the activity event 412 is assigned a correlation identifier (e.g., correlation identifier "Y") that is the same as the correlation identifier assigned to the activity event 410. The activity event 412 is also assigned an occurrence identifier value of "4" because activity event 412 is the fourth error event in the process 400.

The process 400 continues to activity event 414, where it is determined that the process 400 ends with "failure." The activity event 414 is identified as an error event and because the indicated error event of the activity event 414 is generated from the error events of activity events 412 and 410, the activity event 414 is assigned a correlation identifier (e.g., correlation identifier "Y") that is the same as the correlation identifier assigned to the activity events 412 and 410. The activity event 414 is also assigned an occurrence identifier value of "5" because the activity event 414 is the fifth error event in the process 400.

The process 400 may be separated into two event groups. A first event group including each activity event with a correlation identifier of "X" and a second event group including each activity event with a correlation identifier of "Y". In determining the root cause event of the process 400, the first event group is ignored because the first event group is identified as "successfully recovered," and the second event group is reviewed because the second event group is identified as "failure." Utilizing the rules above with respect to FIG. 3, a lowest occurrence time value in the second event group is the root cause activity event of the process 400. Thus, the activity event 410, with an occurrence time value of "3" is the root cause activity event for the failure of process 400.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

Aspects of the disclosure transform a general-purpose computer into a special-purpose computing device when configured to execute the instructions described herein.

The embodiments illustrated and described herein as well as embodiments not specifically described herein but within the scope of aspects of the disclosure constitute exemplary means for determining a root cause activity event.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automated root cause identification; said system comprising:
   a memory area for storing activity event data, said activity event data being received from at least one executing process, said activity event data corresponding to a plurality of activity events, each of said activity events having an activity type, an activity instance identifier, a correlation identifier, a resolution status, and an occurrence time value associated therewith;
   a processor programmed to:
      assign each of the plurality of activity events to one of a plurality of event groups based on the correlation identifier and activity type of the activity events;
      identify at least one of the plurality of event groups having at least one of the activity events assigned thereto with a resolution status indicating failure of the executing process;
      select one of the at least one of the activity events from the identified event group as a root cause activity event based on the occurrence time values; and
      modify the activity event data stored in the memory area to indicate the root cause activity event.

2. The system of claim 1, wherein the root cause activity event is the first activity event in the event group that includes the at least one activity event with a resolution status indicating failure of the executing process.

3. The system of claim 1, wherein the processor is further programmed to determine a level of importance of the plurality of activity events.

4. The system of claim 3, wherein the level of importance of the plurality of activity events is based on an event group type or both an event group type and a root cause activity event.

5. The system of claim 1, wherein activity events that are generated from other activity events are tagged with the same correlation identifier.

6. The system of claim 1, wherein an error event that is generated without a previous associated error event is tagged with a new correlation identifier.

7. A method comprising:
   receiving activity event data from a process executing on a computing device, said activity event data corresponding to a plurality of activity events, each of said activity events having a correlation identifier, a resolution status, and an occurrence time value associated therewith;
   assigning each of the plurality of activity events to one of a plurality of event groups based on the correlation identifier of the activity event;

identifying at least one of the plurality of event groups having at least one of the activity events assigned thereto with a resolution status indicating failure of the process;

selecting one of the at least one of the activity events from the identified event group as a root cause activity event based on the occurrence time values; and identifying the root cause activity event to a user of the computing device.

8. The method of claim 7, wherein one or more of the event groups correspond to an action.

9. The method of claim 8, further comprising determining whether a process has failed based on the one or more activity events assigned to the one or more event groups corresponding to the process.

10. The method of claim 9, further comprising determining a number of times a process has failed during a predefined time period.

11. The method of claim 10, further comprising providing a service ticket based on the determined number of times the process has failed during the predefined time period.

12. The method of claim 7, further comprising presenting the root cause activity event to a user.

13. The method of claim 7, further comprising determining a level of importance of the plurality of activity events.

14. The method of claim 13, wherein the level of importance of the plurality of activity events is based on an event group type or both an event group type and a root cause activity event.

15. The method of claim 7, wherein the root cause activity event is the first activity event in the event group that includes one or more activity events that cannot be automatically recovered.

16. One or more computer storage media having computer-executable components, said components comprising:

an interface component that when executed by at least one processor causes the at least one processor to receive activity event data, said activity event data corresponding to a plurality of activity events, each of said activity events having a correlation identifier, a resolution status, a process identifier, and an occurrence time value associated therewith, wherein at least two of the activity events have the same correlation identifier and different process identifiers;

a correlation component that when executed by at least one processor causes the at least one processor to assign each of the plurality of activity events to one of a plurality of event groups based on the correlation identifier of the activity event;

a location component that when executed by at least one processor causes the at least one processor to identify at least one of the plurality of event groups having at least one of the activity events assigned thereto with a resolution status indicating failure of a process identified by the process identifier of said at least one of the activity events;

a filter component that when executed by at least one processor causes the at least one processor to select one of the at least one of the activity events from the identified event group as a root cause activity event based on the occurrence time values; and a display component that when executed by at least one processor causes the at least one processor to present to a user the activity event data associated with the root cause activity event.

17. The computer storage media of claim 16, wherein the correlation component tags a same correlation identifier to an activity event and any activity event generated therefrom.

18. The computer storage media of claim 16, wherein the filter component determines a level of importance of the plurality of activity events and issues a service ticket based on the determined level of importance of the plurality of activity events.

19. The computer storage media of claim 16, wherein the location component identifies a process that corresponds to an event group.

20. The computer storage media of claim 19, wherein the filter component issues a service ticket based on a determined number of times a process has failed during a predefined time period.

* * * * *